UNITED STATES PATENT OFFICE.

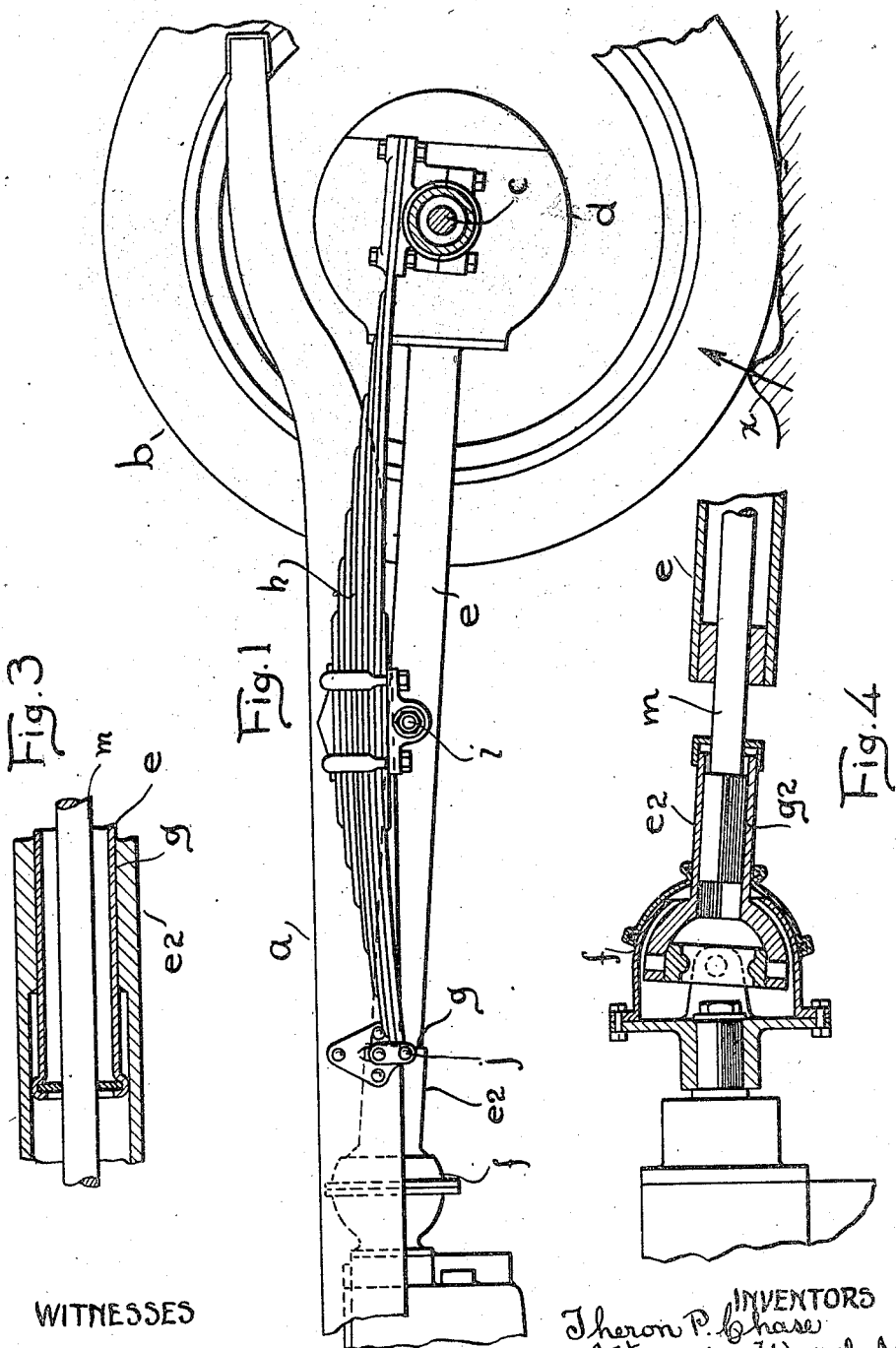

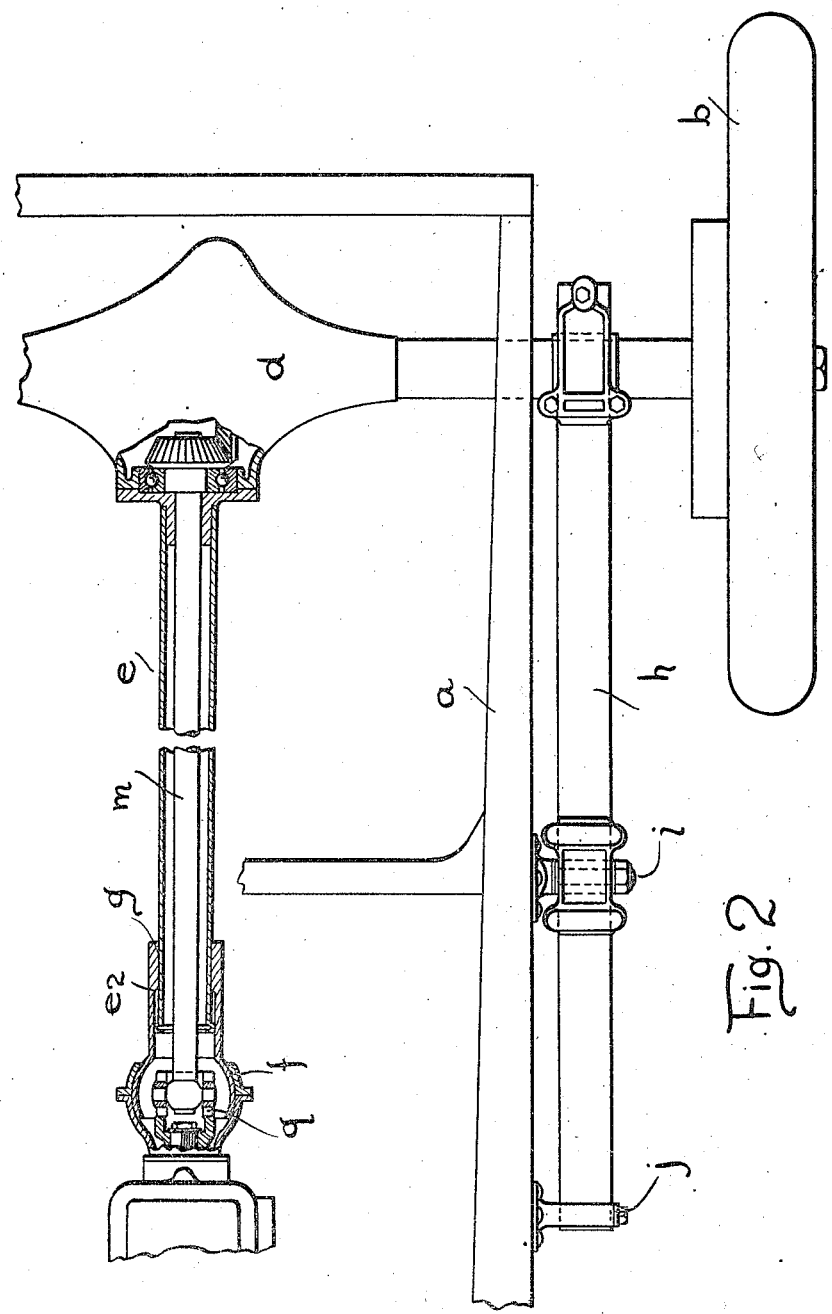

THERON P. CHASE AND ARTEMAS WARD, JR., OF DETROIT, MICHIGAN, ASSIGNORS TO KING MOTOR CAR COMPANY, OF DETROIT, MICHIGAN, A CORPORATION OF MICHIGAN.

SPRING SUSPENSION.

1,149,166.  Specification of Letters Patent.  Patented Aug. 3, 1915.

Application filed April 9, 1914. Serial No. 830,692.

*To all whom it may concern:*

Be it known that we, THERON P. CHASE and ARTEMAS WARD, Jr., citizens of the United States, residing at Detroit, county of Wayne, State of Michigan, have invented a certain new and useful Improvement in Spring Suspension, and declare the following to be a full, clear, and exact description of the same, such as will enable others skilled in the art to which it pertains to make and use the same, reference being had to the accompanying drawings, which form a part of this specification.

Our invention relates to running gear for automobiles and consists in the improvements hereinafter described.

In the accompanying drawings: Figure 1, is an elevation of a part of an automobile chassis embodying our invention, the wheel toward the observer being cut away. Fig. 2, is a plan view of the same portion of the automobile. Fig. 3, is a detail sectional view showing the sliding joint in the casing. Fig. 4, is a modified form of the construction.

$a$ indicates the chassis, $b$ a rear wheel, $c$ the axle, and $d$ the casing for the axle.

$e$ is a tube inclosing the transmission shaft which tube is secured to the casing $d$ and extends forwardly to the casing around the universal joint.

$f$ is a ball and socket joint by which the tube $e$, in the construction shown in Figs. 1, 2 and 3, is secured to the chassis, forming a casing for the universal joint.

$g$, is a slip joint in the tube $e$.

$h$ is a spring of the inverted cantaliver type pivoted to the side piece of the chassis $a$ at $i$ intermediate the ends of said spring and at its rear end secured to the casing $d$, and at its forward end having a connection at $j$ with the side piece of the chassis that shall restrain vertical movement but permit a longitudinal movement of the end of the spring.

In the construction of Figs. 1, 2 and 3, a universal joint permitting a relative motion of the transmission shaft $m$ with reference to the chassis is employed, this construction being indicated at $q$ Fig. 2 and there is a slip joint, shown most distinctly in Fig. 3, in which the tube $e$ slides within a shorter tube $e^2$. By this construction the springs $h$ are left perfectly free to yield to any forces and are not impeded by the torque rods or the parts performing the office of such rods.

There is, of course, a spring $h$ upon each side but only one is illustrated as the construction is the same at both sides of the vehicle.

In the device shown in Fig. 4 there is a universal joint of a different construction from that shown in the other figures in that it does not permit the motion of its various parts longitudinally of the vehicle. Therefore, a special slip joint $g^2$ is provided between the transmission shaft $m$ and one part of the universal joint, and the tubes $e$ and $e^2$ are separated by a little space so as to permit relative motion of the two parts and leave the springs free to act as heretofore. When a vehicle is being driven forward and strikes an obstacle or projecting part of the roadbed as $x$ Fig. 1, the force exerted upon the wheel is inclined somewhat backward and upward as indicated by the arrows. The above construction permits the free movement of the wheel in yielding to the action due to the obstruction.

It will be noted that the form of cantaliver spring shown extends backward from the pivot $i$ in a direction that is substantially at right angles to the average action of the roadbed, as above described.

What we claim is:

1. In an automobile, the combination of a chassis, a driving axle, an inverted cantaliver spring connection between said chassis and driving axle, and means for transmitting power from said chassis to said driving axle, said means being adapted to permit a free movement of said axle longitudinally of the vehicle.

2. In an automobile, the combination of a chassis, a driving axle, an inverted cantaliver spring connected to said chassis and driving axle, means for transmitting power from said chassis to said driving axle, said axle being free to move relative to said chassis except as restrained by said spring connection.

3. In an automobile, the combination of a chassis, a driving axle, an inverted cantaliver spring connected to said chassis and extending backwardly and downwardly and connected to said axle at its rear end, means for transmitting power from said chassis to said driving axle, said driving axle being free to move relative to said chassis except as restrained by said spring connection.

In testimony whereof, we sign this specification in the presence of two witnesses.

THERON P. CHASE.
ARTEMAS WARD, Jr.

Witnesses:
VIRGINIA C. SPRATT,
ELLIOTT J. STODDARD.